May 28, 1957  C. I. McCALL  2,794,062
SHEATHED ELECTRIC CABLE
Filed April 23, 1953
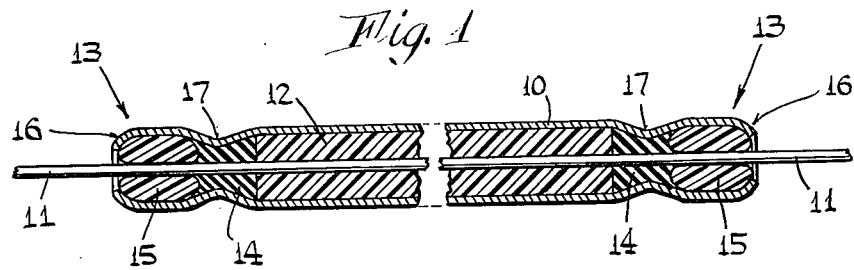
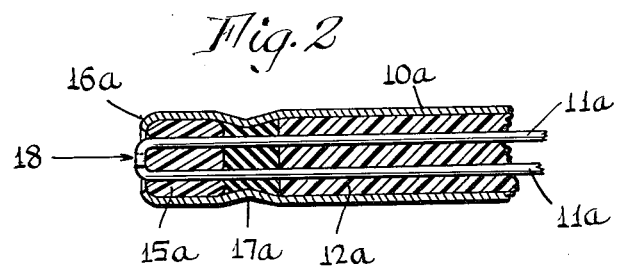
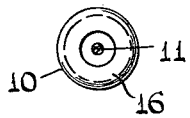  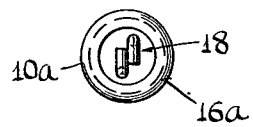
INVENTOR.
Clarence I. McCall
BY
Johnson and Kline
ATTORNEYS

United States Patent Office 2,794,062
Patented May 28, 1957

2,794,062

SHEATHED ELECTRIC CABLE

Clarence I. McCall, Waterbury, Conn., assignor to The Lewis Engineering Company, Naugatuck, Conn., a corporation of Connecticut Application April 23, 1953, Serial No. 350,727

1 Claim. (Cl. 174—77)

This invention relates to electric cables adapted to withstand elevated temperatures, and more particularly to armored or sheath-type cables of this class.

An object of the invention is to provide an improved sheath-type cable adapted to withstand elevated temperatures, wherein the extremities or ends of the sheath element are securely sealed to prevent entrance of moisture or other undesired matter.

Another object of the invention is to provide an improved sheath-type electric cable wherein the conductors at the ends of the sheath element are securely retained in their original positions against lateral shifting and thereby prevented from making contact with the sheath, even under conditions of rough usage.

A still further object of the invention is to provide an improved electric cable in accordance with the above, wherein a limited amount of relative longitudinal movement is possible between the sheath element and the conductor or conductors without materially adversely affecting the seal.

Yet another object of the invention is to provide an improved sheath-type cable as above set forth, which is simple in construction and economical to fabricate, and efficient and reliable during an extended period of use.

Still another object of the invention is to provide an improved sheath-type cable having a plurality of conductors, wherein the conductors are secured together at the end of the sheath element and insulated therefrom so as to constitute a thermocouple, and wherein the said end of the sheath element is securely sealed and adapted to withstand rough usage without failure of the insulation or seal.

Other features and advantages will hereinafter appear.

In the accompanying drawings:

Figure 1 is an axial sectional view of a single-conductor type sheath cable made in accordance with the invention.

Fig. 2 is a fragmentary sectional view of a two-conductor type sheathed cable made in accordance with the invention, the conductors being secured together at their ends and constituting a thermocouple.

Fig. 3 is an end view of the cable of Fig. 1.

Fig. 4 is an end view of the cable of Fig. 2.

Referring to Figs. 1 and 3 the improved single conductor sheathed cable of this invention comprises a tubular metal sheath element 10 through which a wire conductor 11 passes. The element 10 may be formed of any desired material, but is preferably of inconel or equivalent metal having desirable low expansion and heat resistant characteristics. The conductor 11 may be of copper or other metal to suit the particular application of the cable.

As is the usual practice in cable adapted to withstand elevated temperatures, insulation 12 comprising magnesium oxide or other equivalent substance is packed around the conductor 11, centralizing the latter in and insulating it from the sheath 10.

In accordance with this invention improved termini 13 are provided at the ends of the sheath element 10 by which an effective seal is produced between the element and the wire 11, and by which the wire is securely held in centralized insulating position regardless of rough usage to which the cable might be subjected. In addition, the construction is such that a limited amount of relative longitudinal movement may occur between the wire 11 and the ends of the sheath 10 when the cable is bent or curved to make it conform to various space requirements, all without materially adversely affecting the seal or damaging the insulation which spaces the sheath from the wire.

In accomplishing this, I provide readily deformable, heat-resistant sealing bushings 14 within the sheath element 10 adjacent the ends of the element, through which bushings the conductor 11 passes. The bushings 14 are made of a silicone rubber, and are forced into the sheath and brought up tightly against the magnesium oxide insulation 12. I thereafter pass a pair of hard, heat-resistant insulating bushings 15 over the wire 11 and bring these into the ends of the sheath element 10 and into engagement with the sealing bushings 14. The end sections of the cable sheath 10 are shown as circumferentially reduced at portions spaced apart axially of the cable and on opposite sides of the bushings 15, the extremities of the sheath being preferably curled in, as shown at 16, Fig. 1, thereby to hold the bushings 15 captive. The portions 17 at the inner ends of the bushings 15 when diametrically or circumferentially reduced compress the sealing bushings 14 and lock the bushings 15 against the curled extremities 16 of the sheath element 10.

The bushings 15 are made of aluminum oxide, and I have found that when these bushings are incorporated in the sheath 10 as shown, they are extremely resistant to deformation and stresses which may be applied to them, while at the same time providing excellent electrical insulation. Such aluminum oxide bushings readily withstand the forces imposed on them when working the sheath 10 to reduce the axially-spaced portions thereof, and moreover resist rough usage and maintain the conductor 11 centralized and insulated in the sheath element 10 during use of the cable.

The compression of the sealing bushings 14 force them tightly into engagement with the wire conductor 11 and with the inner ends of the bushings 15, and maintain them in sealing engagement with the inside of the sheath element 10. Thus an effective and continuing seal is provided at the end portions of the sheath element, and one which is resistant to heat, vibration and other rough or severe usage. The bushings 14 and 15 will permit a limited amount of relative axial movement of the conductor 11, such as occurs when the cable is bent or formed into various shapes as required by specific applications, without materially adversely affecting the seal.

A modification of the invention is shown in Fig. 2 wherein a sheath 10a carries insulation 12 through which conductors 11a pass and by which the conductors are spaced from the sheath. A hard, heat-resistant insulating bushing 15a of aluminum oxide having two openings through which the wires 11a pass, is held captive in the end of the sheath 10a by an inward curl 16a and a constriction 17a. Between the bushing 15a and the insulation 12a a sealing bushing 14a is provided, of silicone rubber or the like, said bushing being compressed and sealing against the sheath 10a, wires 11a, and bushing 15a. The wires 11a may be of dissimilar metals and the outer ends of the wires may be folded against each other and secured together as indicated at 18, providing a thermocouple whereby the sheathed cable element may be used for heat measurements.

The sheathed cable shown in Figs. 2 and 4 has all of the advantages mentioned above in connection with the cable of Figs. 1 and 3. The aluminum oxide bead or bushing 15a withstands rough usage and securely permanently positions the thermocouple tip 18 in insulated relation to the sheath 10a.

Variations and modifications may be made within the scope of the claim and portions of the improvements may be used without others.

I claim:

In an electric cable adapted to form a hot junction of a thermocouple comprising a pair of wires of different materials extending in spaced relation along the inside of a tubular metal sleeve and being insulated therefrom and from each other by a heat-resistant electrical insulation, said heat-resistant electrical insulation terminating within a zone within said sleeve, the improvement wherein said sleeve has a portion of reduced diameter spaced inwardly from the end thereof, a body of readily deformable, heat-resistant electrical insulation surrounding said wires and disposed within said portion of reduced diameter and adjacent the terminal end of said heat-resistant electrical insulation, a bushing of hard, heat-resistant, electrical insulating metal oxide disposed within the end of the sleeve and having a pair of spaced passages therethrough and the ends of the bushing having rounded edges, the wires passing through said passages and being connected at the outer end of the bushing to form the thermocouple junction, the end of the sleeve being curled over in protective relation with the rounded edges of the outer end of the bushing and maintaining the rounded edges of the inner end of the bushing in engagement with said body of deformable material to cause said material to be deformed against said wires and sleeve to form a seal therefor.

References Cited in the file of this patent
UNITED STATES PATENTS

| Re. 23,679 | Charbonneau et al. | July 7, 1953 |
| 2,357,591 | Kleinfelder | Sept. 5, 1944 |

FOREIGN PATENTS

| 645,797 | Great Britain | Nov. 8, 1950 |